US012658583B2

(12) United States Patent
Sakr

(10) Patent No.: US 12,658,583 B2
(45) Date of Patent: Jun. 16, 2026

(54) DIPOLE ANTENNA STRUCTURES

(71) Applicant: Analog Devices International Unlimited Company, County Limerick (IE)

(72) Inventor: Ahmed Sakr, Cairo (EG)

(73) Assignee: ANALOG DEVICES INTERNATIONAL UNLIMITED COMPANY, County Limerick (IE)

( * ) Notice: Subject to any disclaimer, the term of this patent is extended or adjusted under 35 U.S.C. 154(b) by 87 days.

(21) Appl. No.: 18/440,237

(22) Filed: Feb. 13, 2024

(65) Prior Publication Data

US 2025/0260166 A1 Aug. 14, 2025

(51) Int. Cl.
*H01Q 5/48* (2015.01)
*H01Q 21/28* (2006.01)

(52) U.S. Cl.
CPC ............... *H01Q 5/48* (2015.01); *H01Q 21/28* (2013.01)

(58) Field of Classification Search
CPC ................................. H01Q 5/48; H01Q 21/28
See application file for complete search history.

(56) References Cited

U.S. PATENT DOCUMENTS 5,087,922 A * 2/1992 Tang ...................... H01Q 5/321 343/816
6,147,648 A 11/2000 Granholm et al.
10,741,931 B2 8/2020 Howard
12,107,330 B2 10/2024 Sakr et al.
12,547,576 B2 2/2026 Ryan et al.
2005/0206568 A1 9/2005 Phillips et al.
2005/0264451 A1 12/2005 Aikawa et al.
2008/0094296 A1 4/2008 Lee
2013/0234908 A1 9/2013 Howard et al.
2017/0310017 A1 10/2017 Howard
2018/0062272 A1 3/2018 Haziza
2019/0131715 A1* 5/2019 Zhou ...................... H01Q 9/065
2023/0155270 A1 5/2023 Sakr et al.
2023/0253709 A1 8/2023 Sakr et al.
2023/0261392 A1 8/2023 Sakr et al.
2024/0055765 A1 2/2024 Sakr
2024/0275058 A1 8/2024 Sakr et al.
2025/0038409 A1 1/2025 Sakr et al.
2025/0038427 A1 1/2025 Sakr et al.
2025/0112372 A1 4/2025 Sakr et al.
2025/0260166 A1 8/2025 Sakr
(Continued)

OTHER PUBLICATIONS

Alibakhshikenari, Mohammad, et al. "High-isolation antenna array using SIW and realized with a graphene layer for sub-terahertz wireless applications." Scientific Reports 11.1 (2021): 10218.
(Continued)

*Primary Examiner* — Graham P Smith
(74) *Attorney, Agent, or Firm* — Knobbe, Martens, Olson & Bear, LLP

(57) ABSTRACT

Dipole antenna structures are disclosed. In certain embodiments, a dipole antenna structure includes a first dipole, a second dipole, a third dipole, and a fourth dipole aligned in parallel. The dipole antenna structure further includes a signal delay line structure electrically connected to a common signal feed. The dipoles are electrically connected to the common signal feed through the signal delay line structure.

20 Claims, 7 Drawing Sheets

(56) References Cited

U.S. PATENT DOCUMENTS

2025/0279591 A1 9/2025 Sakr

OTHER PUBLICATIONS

A. B. Abdel-Rahman and M. Aboualalaa, “Improving Isolation Between Antenna Array Elements Using Lossy Microstrip Resonators,” 2019 13th European Conference on Antennas and Propagation (EuCAP), Krakow, Poland, 2019, pp. 1-4.

J. Donnellan, “A spiral-doublet scanning array,” in IRE Transactions on Antennas and Propagation, vol. 9, No. 3, pp. 276-279, May 1961, doi: 10.1109/TAP.1961.1144997.

* cited by examiner

DIPOLE ANTENNA STRUCTURES

FIELD OF THE DISCLOSURE

Embodiments of the invention relate to electronic systems, and more particularly, to antennas for radio frequency (RF) communications.

BACKGROUND

Antennas can be used in a wide variety of applications to transmit and/or receive radio frequency (RF) signals. Example applications using antennas include radar, satellite, military, and/or cellular communications.

SUMMARY OF THE DISCLOSURE

Dipole antenna structures are disclosed. In certain embodiments, a dipole antenna structure includes a first dipole, a second dipole, a third dipole, and a fourth dipole aligned in parallel. The dipole antenna structure further includes a signal delay line structure electrically connected to a common signal feed. The dipoles are electrically connected to the common signal feed through the signal delay line structure. Such a dipole antenna structure has been found to exhibit low coupling (for instance, low cross polarization) and high gain.

In one aspect, a circuit board is disclosed. The circuit board includes a first conductive layer including a first plurality of dipoles of a first antenna structure, the first plurality of dipoles including a first dipole, a second dipole, a third dipole, and a fourth dipole aligned in parallel. The circuit board further includes a second conductive layer including a first signal delay line structure of the first antenna structure, wherein the first signal delay line structure is electrically connected to a first common signal feed. The circuit board further includes a plurality of vias including a first via coupling the first dipole to the first signal delay line structure, a second via coupling the second dipole to the first signal delay line structure, a third via coupling the third dipole to the first signal delay line structure, and a fourth via coupling the fourth dipole to the first signal delay line structure.

In another aspect, a method of antenna formation is disclosed. The method includes patterning a first conductive layer of a circuit board to include a first plurality of dipoles of a first antenna structure, the first plurality of dipoles including a first dipole, a second dipole, a third dipole, and a fourth dipole aligned in parallel. The method further includes patterning a second conductive layer of the circuit board to include a first signal delay line structure of the first antenna structure, wherein the first signal delay line structure is electrically connected to a first common signal feed. The method further includes forming a plurality of vias including a first via coupling the first dipole to the first signal delay line structure, a second via coupling the second dipole to the first signal delay line structure, a third via coupling the third dipole to the first signal delay line structure, and a fourth via coupling the fourth dipole to the first signal delay line structure.

In another aspect, a radio frequency communication system includes a front end system and an antenna array electrically connected to the front end system and formed on a circuit board. A first antenna structure of the antenna array includes a first plurality of dipoles formed in a first conductive layer of the circuit board, the first plurality of dipoles including a first dipole, a second dipole, a third dipole, and a fourth dipole aligned in parallel. The first antenna structure further includes a first signal delay line structure formed in a second conductive layer of the circuit board, wherein the first signal delay line structure is connected to a first common signal feed. The first antenna structure further includes a plurality of vias including a first via coupling the first dipole to the first signal delay line structure, a second via coupling the second dipole to the first signal delay line structure, a third via coupling the third dipole to the first signal delay line structure, and a fourth via coupling the fourth dipole to the first signal delay line structure.

DETAILED DESCRIPTION OF EMBODIMENTS

The following detailed description of embodiments presents various descriptions of specific embodiments of the invention. However, the invention can be embodied in a multitude of different ways. In this description, reference is made to the drawings. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

Figure 1:
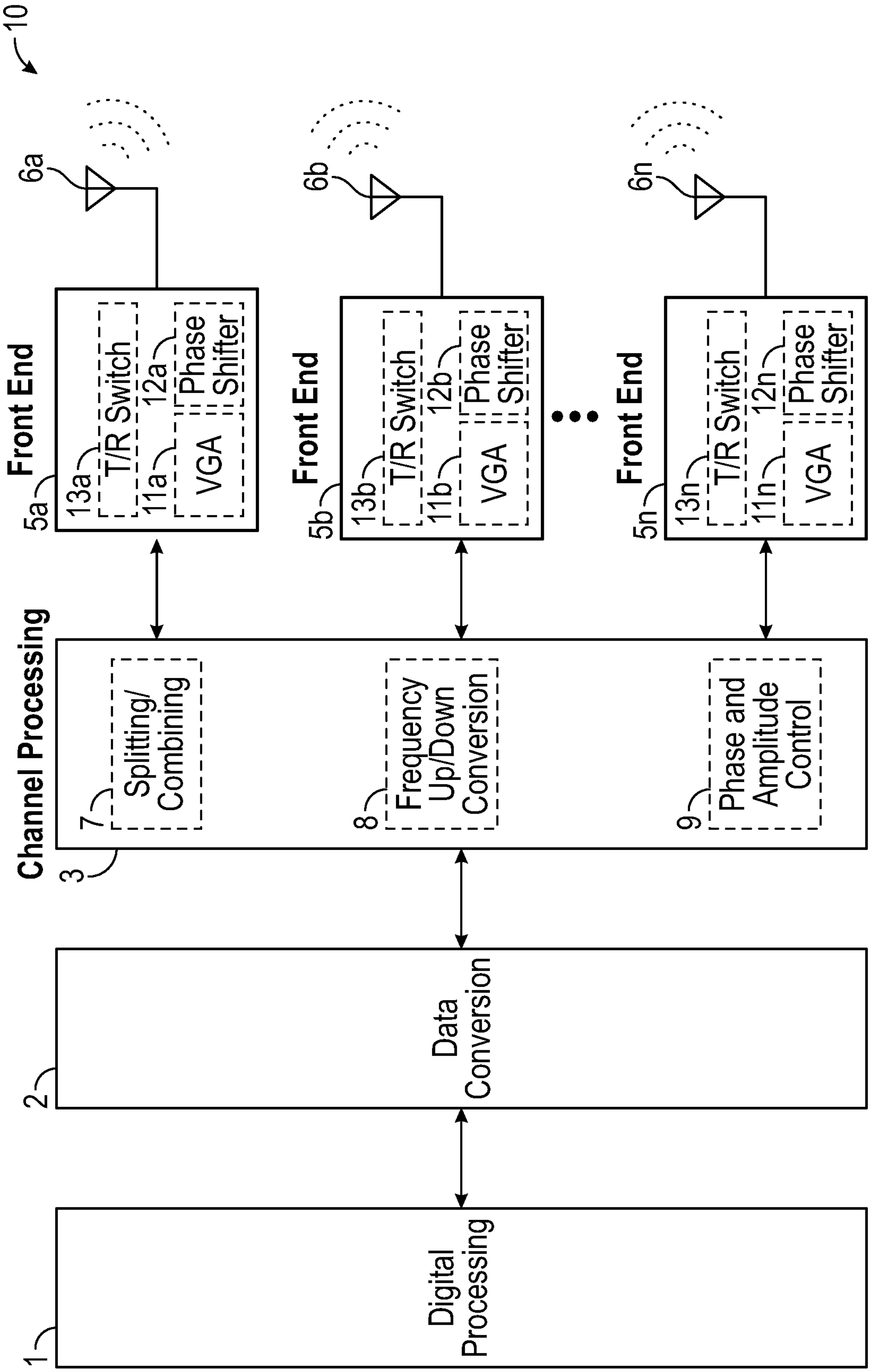
FIG. 1 is a schematic diagram of one embodiment of a phased array antenna system.

FIG. 1 is a schematic diagram of one embodiment of a phased array antenna system 10. The phased array antenna system 10 includes a digital processing circuit 1, a data conversion circuit 2, a channel processing circuit 3, RF front ends 5*a*, 5*b*, . . . 5*n*, and antennas 6*a*, 6*b*, . . . 6*n*. Although an example system with three RF front ends and three antennas is illustrated, the phased array antenna system 10 can include more or fewer RF front ends and/or more or fewer antennas as indicated by the ellipses. Furthermore, in certain implementations, the phased array antenna system 10 is implemented with separate antennas for transmitting and receiving signals.

The phased array antenna system 10 illustrates one embodiment of an electronic system that can include one or more antennas implemented in accordance with the teachings herein. However, the antennas disclosed herein can be used in a wide range of electronics. A phased array antenna system is also referred to herein as an active scanned electronically steered array or beamforming communication system.

As shown in FIG. 1, the channel processing circuit 3 is coupled to antennas 6*a*, 6*b*, . . . 6*n* through RF front ends 5*a*, 5*b*, . . . 5*n*, respectively. The channel processing circuit 3 includes a splitting/combining circuit 7, a frequency up/down conversion circuit 8, and a phase and amplitude control circuit 9, in this embodiment. The channel processing circuit 3 provides RF signal processing of RF signals transmitted by and received from each communication channel. In the illustrated embodiment, each communication channel is associated with a corresponding RF front end and antenna. However, other implementations are possible.

With continuing reference to FIG. 1, the digital processing circuit 1 generates digital transmit data for controlling a transmit beam radiated from the antennas 6*a*, 6*b*, . . . 6*n*. The digital processing circuit 1 also processes digital receive data representing a receive beam received by the antennas 6*a*, 6*b*, . . . 6*n*. In certain implementations, the digital processing circuit 1 includes one or more baseband processors.

As shown in FIG. 1, the digital processing circuit 1 is coupled to the data conversion circuit 2, which can include digital-to-analog converter (DAC) circuitry for converting digital transmit data to one or more baseband transmit signals and analog-to-digital converter (ADC) circuitry for converting one or more baseband receive signals to digital receive data.

The frequency up/down conversion circuit 8 provides frequency upshifting from baseband to RF and frequency downshifting from RF to baseband, in this embodiment. However, other implementations are possible, such as configurations in which the phased array antenna system 10 operates in part at an intermediate frequency (IF) or in which RF data converters provide direct conversion between digital and RF. In certain implementations, the splitting/combining circuit 7 provides splitting to one or more frequency upshifted transmit signals to generate RF signals suitable for processing by the RF front ends 5*a*, 5*b*, . . . 5*n* and subsequent transmission on the antennas 6*a*, 6*b*, . . . 6*n*. Additionally, the splitting/combining circuit 7 combines RF signals received vias the antennas 6*a*, 6*b*, . . . 6*n* and RF front ends 5*a*, 5*b*, . . . 5*n* to generate one or more baseband receive signals for the data conversion circuit 2.

The channel processing circuit 3 also includes the phase and amplitude control circuit 9 for controlling beamforming operations. For example, the phase and amplitude control circuit 9 controls the amplitudes and phases of RF signals transmitted or received via the antennas 6*a*, 6*b*, . . . 6*n* to provide beamforming.

With respect to signal transmission, the RF signals radiated from the antennas 6*a*, 6*b*, . . . 6*n* aggregate through constructive and destructive interference to collectively generate a transmit beam having a particular direction. With respect to signal reception, the channel processing circuit 3 generates a receive beam by combining the RF signals received from the antennas 6*a*, 6*b*, . . . 6*n* after amplitude scaling and phase shifting.

Phased array antenna systems are used in a wide variety of applications including, but not limited to, mobile communications, military and defense systems, and/or radar technology.

As shown in FIG. 1, the RF front ends 5*a*, 5*b*, . . . 5*n* each include one or more VGAs 11*a*, 11*b*, . . . 11*n*, which are used to scale the amplitude of RF signals transmitted or received by the antennas 6*a*, 6*b*, . . . 6*n*, respectively. Additionally, the RF front ends 5*a*, 5*b*, . . . 5*n* each include one or more phase shifters 12*a*, 12*b*, . . . 12*n*, respectively, for phase-shifting the RF signals. For example, in certain implementations, the phase and amplitude control circuit 9 generates gain control signals for controlling the amount of gain provided by the VGAs 11*a*, 11*b*, . . . 11*n* and phase control signals for controlling the amount of phase shifting provided by the phase shifters 12*a*, 12*b*, . . . 12*n*.

The phased array antenna system 10 operates to generate a transmit beam and/or receive beam including a main lobe pointed in a desired direction of communication. The phased array antenna system 10 realizes increased signal to noise (SNR) ratio in the direction of the main lobe. The transmit beam and/or receive beam also includes one or more side lobes, which point in different directions than the main lobe and are undesirable.

An accuracy of beam direction of the phased array antenna system 10 is based on a precision in controlling the gain and phases of the RF signals communicated via the antennas 6*a*, 6*b*, . . . 6*n*. For example, when one or more of the RF signals has a large phase error, the beam can be broken and/or pointed in an incorrect direction. Furthermore, the size or magnitude of beam side lobe levels is based on an accuracy in controlling the phases and amplitudes of the RF signals.

Accordingly, it is desirable to tightly control the phase and amplitude of RF signals communicated by the antennas 6*a*, 6*b*, . . . 6*n* to provide robust beamforming operations.

Although the phased array antenna system 10 of FIG. 1 depicts one example of an RF communication system that can include antennas, the teachings herein are also applicable to other types of RF communication systems.

Figure 2A:
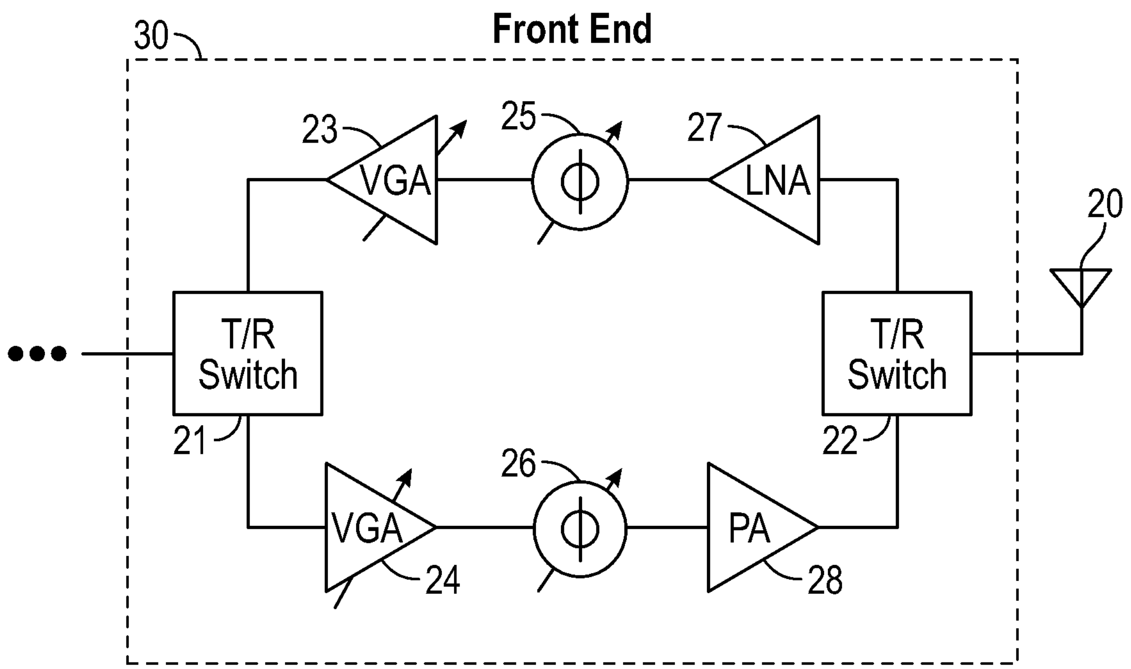
FIG. 2A is a schematic diagram of one embodiment of a front end system.

FIG. 2A is a schematic diagram of one embodiment of a front end system 30. The front end system 30 includes a first transmit/receive (T/R) switch 21, a second transmit/receive switch 22, a receive-path VGA 23, a transmit-path VGA 24, a receive-path controllable phase shifter 25, a transmit-path phase shifter 26, a low noise amplifier (LNA) 27, and a power amplifier (PA) 28. As shown in FIG. 2A, the front end system 30 is depicted as being coupled to an antenna 20.

The antenna 20 can correspond to a antenna implemented in accordance with any of the embodiments herein. Although FIG. 2A depicts one example of a front-end system that can transmit and receive RF signals, the antennas herein can operate in combination with a wide variety of types of RF front ends. Accordingly, other implementations are possible.

The front end system 30 can be included in a wide variety of RF systems, including, but not limited to, phased array antenna systems, such as the phased array antenna system 10 of FIG. 1. For example, multiple instantiations of the front end system 30 can be used to implement the RF front ends 5*a*, 5*b*, . . . 5*n* of FIG. 1. In certain implementations, one or more instantiations of the front end system 30 are fabricated on a semiconductor die or chip.

As shown in FIG. 2A, the front end system 30 includes the receive-path VGA 23 for controlling an amount of amplification provided to an RF input signal received on the antenna 20, and the transmit-path VGA 24 for controlling an amount of amplification provided to an RF output signal transmitted on the antenna 20. Additionally, the front end system 30 includes the receive-path controllable phase shifter 25 for controlling an amount of phase shift to an RF input signal received on the antenna 20, and the transmit-path controllable phase shifter 26 for controlling an amount of phase shift provided to the RF output signal transmitted on the antenna 20.

The gain control provided by the VGAs and the phase control provided by the phase shifters can serve a wide variety of purposes including, but not limited to, compensating for temperature and/or process variation. Moreover, in beamforming applications, the VGAs and phase shifters can control side-lobe levels of a beam pattern.

Figure 2B:
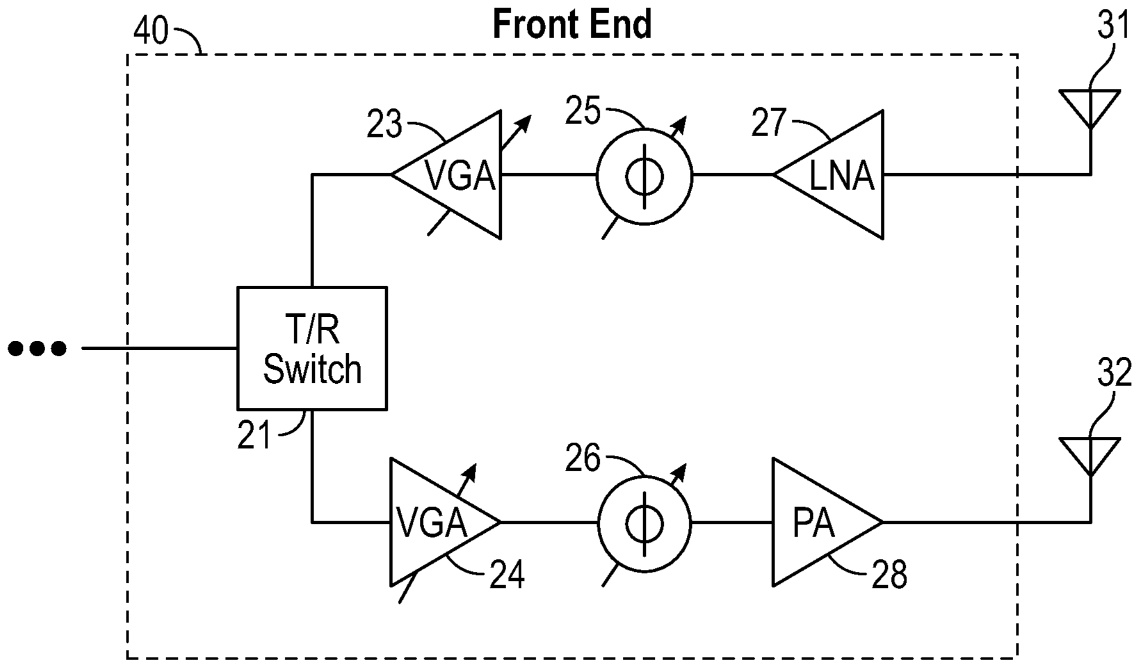
FIG. 2B is a schematic diagram of another embodiment of a front end system.

FIG. 2B is a schematic diagram of another embodiment of a front end system 40. The front end system 40 of FIG. 2B is similar to the front end system 30 of FIG. 2A, except that the front end system 40 omits the second transmit/receive switch 22. As shown in FIG. 2B, the front end system 40 is depicted as being coupled to a receive antenna 31 and to a transmit antenna 32.

The receive antenna 31 and/or the transmit antenna 32 can correspond to an antenna implemented in accordance with any of the embodiments herein. Although FIG. 2B depicts another example of a front-end system that can transmit and receive RF signals on antennas, the antennas herein can operate in combination with a wide variety of types of RF front ends. Accordingly, other implementations are possible.

The front end system 40 operates with different antennas for signal transmission and reception. In the illustrated embodiment, the receive-path VGA 23 controls an amount of amplification provided to an RF input signal received on the receive antenna 31, and the transmit-path VGA 24 controls an amount of amplification provided to an RF output signal transmitted on the second antenna 32. Additionally, the receive-path phase shifter 25 controls an amount of phase shift provided to the RF input signal received on the receive antenna 31, and the transmit-path phase shifter 26 controls an amount of phase shift provided to an RF output signal transmitted on the second antenna 32.

Examples of Dipole Antenna Structures

An antenna array can include an array of antennas placed in a two-dimensional arrangement and spaced in a manner to direct radiation in a specific direction. The directed beam can be normal to a plane containing the antenna array or can be titled at a specific angle. For example, antenna arrays with down-tilted beams are attractive for high altitude applications such as base-station towers, indoor access points, and/or roof top communications equipment.

The directed beam from an antenna array has a beam angle that can be controlled by the phase shifts among antenna elements of the array. Such phase shifts are provided by phase shifters that can be fabricated on one or more beamformer integrated circuits (ICs) or chips that feed the antenna array. For example, the RF signals radiated from the antennas of an array combine through constructive and destructive interference to collectively generate a transmit beam having a particular direction.

Antenna arrays suffer from high coupling among adjacent antenna elements within the array. High coupling causes the impedance to be very dependent on the phases given to the antenna elements by the phase shifters, which makes the array performance degrade with increasing scanning angle.

Having high coupling among the antenna elements limits the possibility of transmitting and/or receiving multiple data streams on the same millimeter wave (mm-wave) circuit board, which is desired for certain applications, such as sixth generation (6G) cellular communications.

An antenna structure can include a first port for a first signal polarization (for instance, horizontal) and a second port for a second signal polarization (for instance, vertical). When such antennas are arranged in an array, one type of coupling mechanism is co-polarization (co-pol) coupling, which arises from coupling between the same polarization ports of the antennas. For example, co-pol coupling arises from coupling from one horizontally polarized port to another horizontally polarized port, as well as from one vertically polarized port to another vertically polarized port. Another type of coupling mechanism is cross-polarization (X-pol) coupling, which arises from coupling between the opposite polarization ports of the antennas. For example, X-pol coupling arises from coupling from one horizontally polarized port to a vertically polarized port, as well as from one vertically polarized port to a horizontally polarized port.

Coupling for a typical dual polarization patch antenna array can be of an order of about −15 dB to about −10 dB, while applications for 6G specify coupling below −30 dB. There is a tradeoff between a desire for each antenna to properly radiate and a desire for each antenna to also not radiate to adjacent elements to cause coupling.

Dipole antenna structures are disclosed herein. In certain embodiments, a dipole antenna structure includes a first dipole, a second dipole, a third dipole, and a fourth dipole that extend in a common direction such that the dipoles are physically in parallel with one another. The dipoles are of about equal length (for instance, half a wavelength of a resonant frequency of the dipole antenna structure) and spaced apart from one another. The dipoles are electrically connected to a common signal feed through a signal delay line structure.

Such a dipole antenna structure has been found to exhibit low coupling (for instance, low X-pol) and high gain. For instance, two dipoles typically achieve gain close to that of a patch antenna, and thus four dipoles act as a doublet with much better X-pol while occupying a more compact size.

In certain implementations, the first dipole is electrically connected to the common signal feed through a first signal delay line, while the second dipole is electrically connected to the common signal feed through both a second signal delay line and the first signal delay line. Thus, the delay between the second dipole and the common signal feed is greater than the delay between the first dipole and the common signal feed. Likewise, the third dipole can be electrically connected to the common signal feed through a third signal delay line, while the fourth dipole can be electrically connected to the common signal feed through both a fourth signal delay line and the third signal delay line.

The signal delay line structure can be implemented such the first signal delay line and the third signal delay line are of about equal length (for instance, nominally equal length absent manufacturing variation), and such that the second signal delay line and fourth signal delay line are of about equal length. Thus, the signal delays from the common signal feed to the first dipole and the third dipole can matched, while the signal delays to the second dipole and the fourth dipole can also be matched.

In certain implementations, the first and third dipoles are positioned as an inner pair of dipoles, while the second and fourth dipoles are positioned as an outer pair of dipoles. Thus, the first and third dipoles can be positioned between the second and fourth dipoles.

The dipole antenna structure can serve as an antenna of a larger array. Furthermore, one antenna can be rotated by about 90 degrees relative to another antenna to achieve different polarizations. For example, a dipole antenna structure with dipoles that are aligned in an x-direction can radiate with a first polarization (for instance, horizontal), while a dipole antenna structure with dipoles that are aligned in a y-direction can radiate with a second polarization (for instance, vertical).

To achieve an even more compact layout, a dual polarized dipole antenna structure can be provided in which both horizontally polarized dipoles and vertically polarized dipoles are included in a common footprint. For example, such an antenna structure can include four pairs of dipoles implemented with a 90-degree radial symmetry about a center of the antenna's footprint.

The dipole antenna structures disclosed herein can be small and formed using printed circuit board (PCB) technology. The dipole antenna structures can be arranged in an array in a manner desired for a particular application, such as 6G cellular. Furthermore, the dipoles antenna structures can be used to transmit and/or receive RF signals, including millimeter wave signals.

Figure 3A:
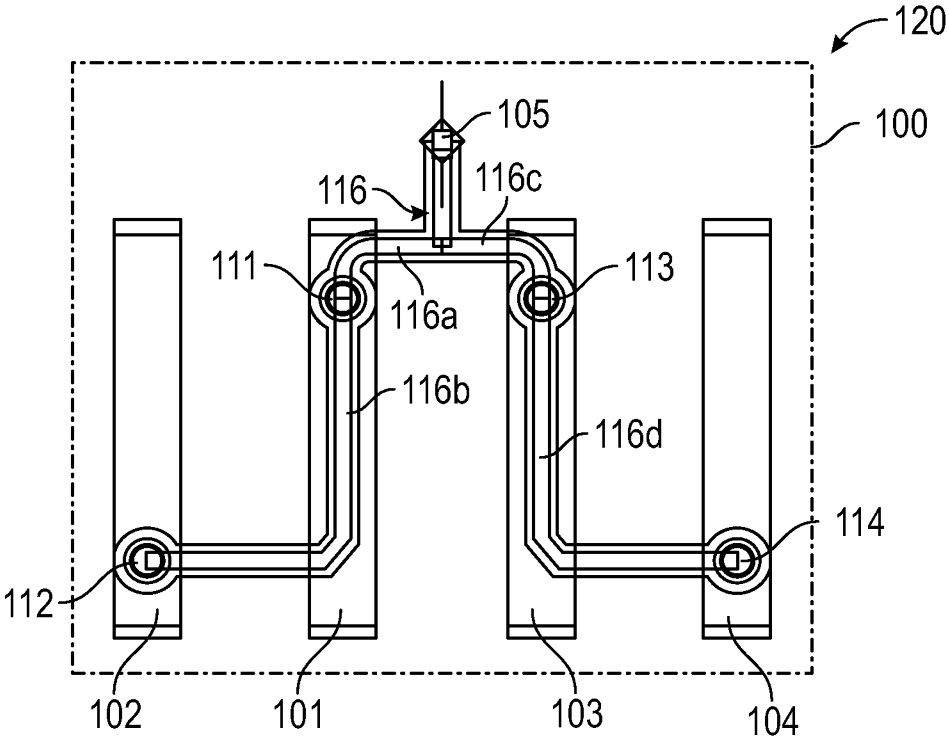
FIG. 3A is a schematic diagram of one embodiment of a dipole antenna structure.

FIG. 3A is a schematic diagram of one embodiment of a dipole antenna structure 120. The dipole antenna structure 120 includes a first dipole 101, a second dipole 102, a third dipole 103, a fourth dipole 104, a common signal feed 105, a first via 111, a second via 112, a third via 113, a fourth via 114, and a signal delay line structure 116.

The dipole antenna structure 120 is formed on a circuit board 100, which includes a first conductive layer on which the first dipole 101, the second dipole 102, the third dipole 103, and the fourth dipole 104 are formed. The circuit board 100 also includes a second conductive layer that is separated from the first conductive layer by dielectric. The first via 111 couples the first dipole 101 to the signal delay line structure 116, the second via 112 couples the second dipole 102 to the signal delay line structure 116, the third via 113 couples the third dipole 103 to the signal delay line structure 116, and the fourth via 114 couples the fourth dipole 104 to the signal delay line structure 116. The coupling of each via the signal delay line structure 116 can be by direct metal connection or by capacitive coupling, in some embodiments.

The signal delay line structure 116 is formed on the second conductive layer, and includes a first delay line 116*a* between the common signal feed 105 and the first via 111, a second delay line 116*b* between the first via 111 and the second via 112, a third delay line 116*c* between the common signal feed 105 and the third via 113, and a fourth delay line 116*d* between the third via 113 and the fourth via 114.

In certain implementations, the circuit board 100 corresponds to a printed circuit board (PCB), with each dipole formed during patterning the first conductive layer and with the signal delay line structure 116 formed during patterning the second conductive layer. Additionally, the vias 111-114 are formed by conductors formed through the dielectric that separates the first conductive layer from the second conductive layer. Thus, the dipole antenna structure 120 can be formed using PCB technologies using metallization patterned on different conductive layers and interconnected by vias.

Although two conductive layers are depicted for clarity of the figure, the circuit board 100 can include additional layers. In one example, the circuit board 100 further includes a third conductive layer that contains a ground plane.

In the illustrated embodiment, the first dipole 101, the second dipole 102, the third dipole 103, and the fourth dipole 104 extend in a common direction (vertically or in a y-direction with respect to an orientation of the figure sheet). Thus, the dipoles 101-104 are physically in parallel with one another. The dipoles 101-104 are of about equal length, for instance, nominally equal in length absent manufacturing variation. The length of the dipoles 101-104 can correspond to about half a wavelength of a resonant frequency of the dipole antenna structure 120. As shown in FIG. 3A, the dipoles 101-104 are spaced apart from one another but have aligned top and bottom edges, in this embodiment.

As shown in FIG. 3A, the first dipole 101 is electrically connected to the common signal feed 105 through the first signal delay line 116*a*, while the second dipole 102 is electrically connected to the common signal feed 105 through both the second signal delay line 116*b* and the first signal delay line 116*a*. Additionally, the third dipole 113 is electrically connected to the common signal feed 105 through the third signal delay line 116*c*, while the fourth dipole 104 is electrically connected to the common signal feed 105 through both the fourth signal delay line 116*d* and the third signal delay line 116*c*.

In the illustrated embodiment, the first signal delay line 116*a* and the third signal delay line 116*c* have about equal length. Additionally, the second signal delay line 116*b* and the fourth signal delay line 116*d* have about equal length. In certain implementations, the second signal delay line 116*b* and the fourth signal delay line 116*d* are half wavelength delay lines having a length that is about equal to half the wavelength of a resonant frequency of the dipole antenna structure 120.

As shown in FIG. 3A, the first dipole 101 and the third dipole 103 are positioned as an inner pair of dipoles, while the second dipole 102 and the fourth dipole 104 are positioned as an outer pair of dipoles. Thus, the first dipole 101 and the third dipole 103 are positioned between the second dipole 102 and the fourth dipole 104.

In the illustrated embodiment, the first via 111 and the third via 113 are positioned on one side of the dipoles 101-104 (corresponding to a top side of FIG. 3A) while the second via 112 and the fourth via 114 are positioned on an opposite side of the dipoles 101-104 (corresponding to a bottom side of FIG. 3A).

Figure 3B:
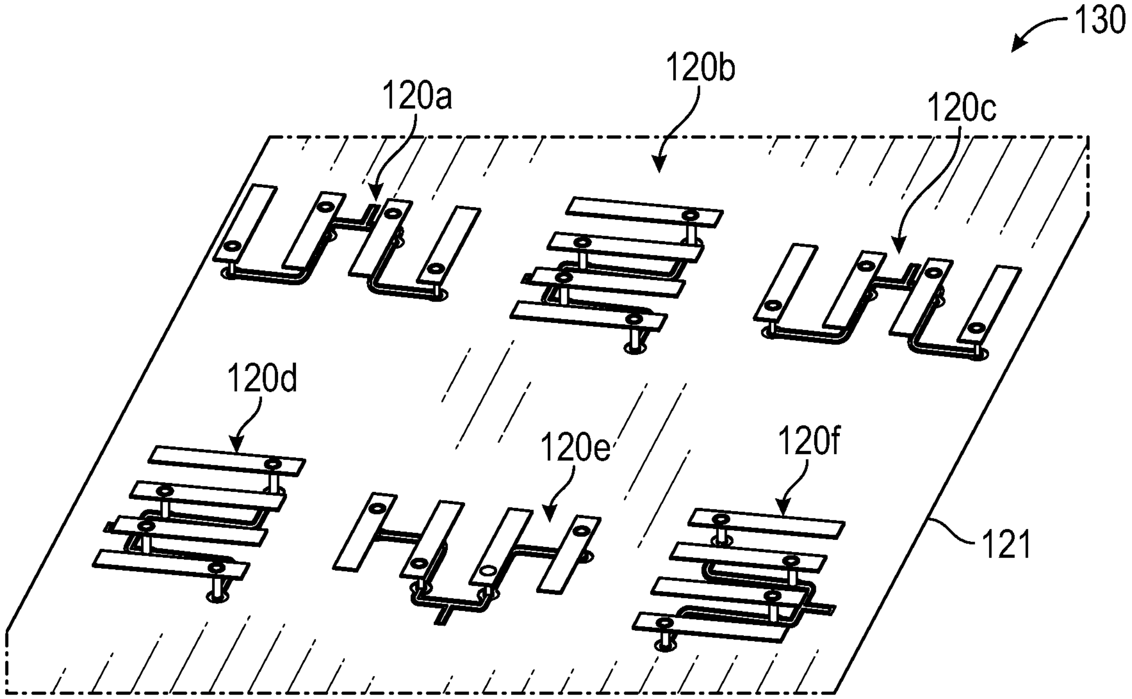
FIG. 3B is a schematic diagram of one embodiment of an antenna array.

FIG. 3B is a schematic diagram of one embodiment of an antenna array 130. The antenna array 130 includes six instantiations of the dipole antenna structure 120 of FIG. 3A formed on a circuit board 121 and arranged in a two-by-three (2×3) array. The circuit board 121 is shown at a perspective angle to depict the first conductive layer on which the dipoles are formed and the second conductive layer on which the signal delay lines are formed. The conductive layers are separated by dielectric through which the depicted vias are formed. Although an example of a 3×2 antenna array is shown, the dipole antenna structures disclosed herein can be arranged in a wide variety of ways in an array. Such arrays include not only uniform arrays of m rows by n columns of antennas (where m and n are each an integer greater than or equal to 1), but also to non-uniform arrays.

In the illustrated embodiment, the antenna array 130 includes a top row including a first dipole antenna structure 120*a*, a second dipole antenna structure 120*b*, and a third dipole antenna structure 120*c*. Additionally, the second dipole antenna structure 120*b* is positioned between the first dipole antenna structure 120*a* and the third dipole antenna structure 120*c* and is rotated by about 90 degrees relative to the first dipole antenna structure 120*a* and the third dipole antenna structure 120*c*. The antenna array 130 further includes a bottom row including a fourth dipole antenna structure 120*d*, a fifth dipole antenna structure 120*c*, and a sixth dipole antenna structure 120*f*. Additionally, the fifth dipole antenna structure 120*c* is positioned between the fourth dipole antenna structure 120*d* and the sixth dipole antenna structure 120*f* and is rotated by about 90 degrees relative to the fourth dipole antenna structure **120*d* and the sixth dipole antenna structure 120*f***.

Thus, in the embodiment illustrated in FIG. 3A, the dipoles of the first dipole antenna structure **120*a*, the third dipole antenna structure 120*c*, and the fifth dipole antenna structure 120*e* extend in a first direction, while the dipoles of the second dipole antenna structure 120*b*, the fourth dipole antenna structure 120*d*, and the sixth dipole antenna structure 120*f*** extend in a second direction that is perpendicular to the first direction.

By implementing the dipole antenna structures with different orientations, a polarization of each dipole antenna structure can be controlled. For example, the first dipole antenna structure **120*a*, the third dipole antenna structure 120*c*, and the fifth dipole antenna structure 120*e* can have a first polarization (for instance, vertical), while the second dipole antenna structure 120*b*, the fourth dipole antenna structure 120*d*, and the sixth dipole antenna structure 120*f*** can have a second polarization (for instance, horizontal).

The dipole antenna structures **120*a*-120*f*** can have any desired spacing between rows and columns to achieve a desired isolation.

Figure 4:
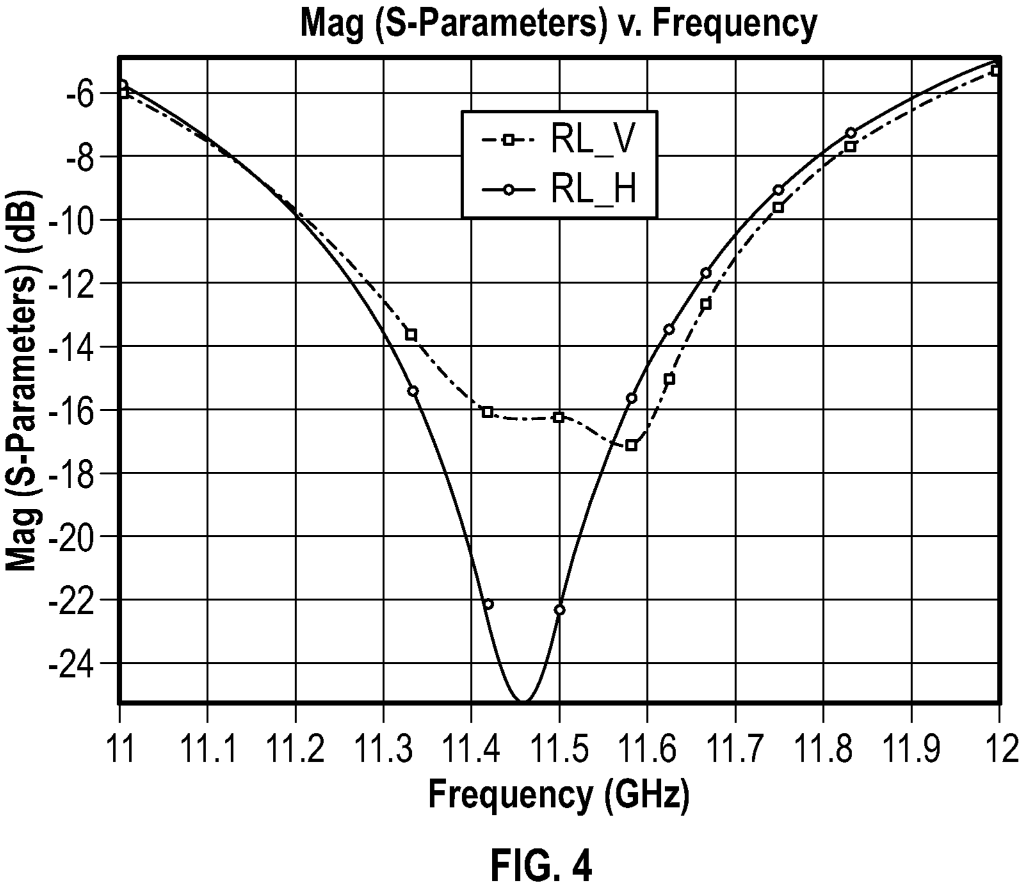
FIG. 4 is a graph of one example of return loss versus frequency for the antenna array of FIG. 3B.

FIG. 4 is a graph of one example of return loss versus frequency for the antenna array of FIG. 3B. Return loss for both horizonal polarization (RL_H) and vertical polarization (RL_V) is shown. As shown in FIG. 4, the antenna array exhibits excellent return loss over a range of frequency spanning from 11 GHz to 12 GHz.

Figure 5A:
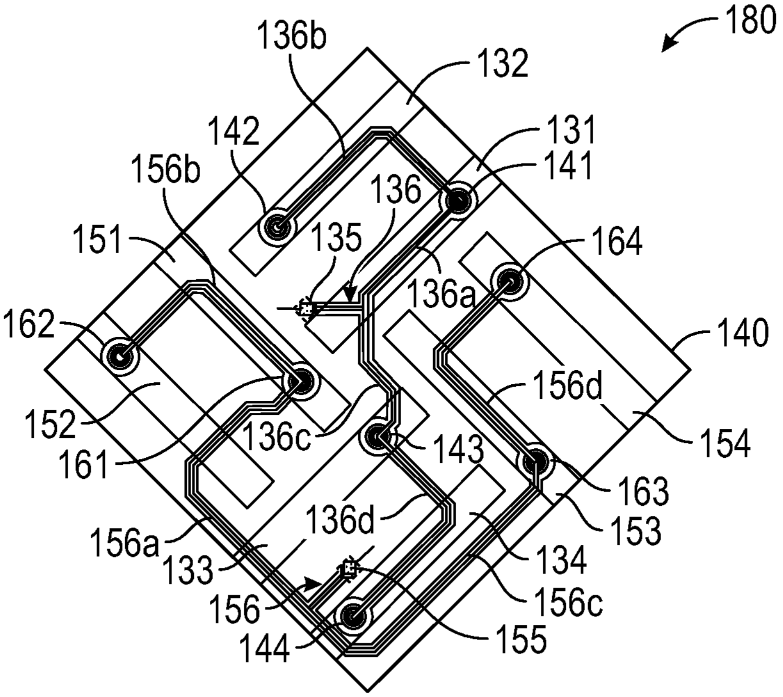
FIG. 5A is a schematic diagram of one embodiment of a dual polarized dipole antenna structure.

FIG. 5A is a schematic diagram of one embodiment of a dual polarized dipole antenna structure 180. The dual polarized dipole antenna structure 180 is formed on a circuit board 140 and includes a first group of antenna components for handling a first signal polarization (for example, horizontal) and a second group of antenna components for handling a second signal polarization (for example, vertical).

The first group of antenna components includes a first dipole 131, a second dipole 132, a third dipole 133, a fourth dipole 134, a first common signal feed 135, a first signal delay line structure 136, a first via 141, a second via 142, a third via 143, and a fourth via 144. The first to fourth vias 141-144, respectively, electrically couple the first signal delay line structure 136 to the first to fourth dipoles 131-134, respectively. Additionally, the first signal delay line structure 136 includes a first delay line **136*a* between the first common signal feed 135 and the first via 141, a second delay line 136*b* between the first via 141 and the second via 142, a third delay line 136*c* between the first common signal feed 135 and the third via 143, and a fourth delay line 136*d* between the third via 143 and the fourth via 144**.

With continuing reference to FIG. 5A, the second group of antenna components includes a first dipole 151, a second dipole 152, a third dipole 153, a fourth dipole 154, a second common signal feed 155, a second signal delay line structure 156, a first via 161, a second via 162, a third via 163, and a fourth via 164. The first to fourth vias 161-164, respectively, electrically couple the second signal delay line structure 156 to the first to fourth dipoles 151-154, respectively. Additionally, the second signal delay line structure 156 includes a first delay line **156*a* between the second common signal feed 155 and the first via 161, a second delay line 156*b* between the first via 161 and the second via 162, a third delay line 156*c* between the second common signal feed 155 and the third via 163, and a fourth delay line 166*d* between the third via 163 and the fourth via 164**.

The illustrated embodiment incudes components for horizontal and vertical polarizations combined into a common footprint for a highly compact layout. For example, the dipoles 131-134 for the first polarization (for example, horizontal) are aligned with a first direction, while the dipoles 151-154 for the second polarization (for example, vertical) are aligned with a second direction. The first direction and the second direction are substantially perpendicular (for instance, nominally perpendicular absent manufacturing). Furthermore, with respect to an orientation of FIG. 5A, the dipoles 131-132 are positioned in an upper quadrant of the antenna footprint, the dipoles 151-152 are positioned in a left quadrant of the antenna footprint, the dipoles 133-134 are positioned in a bottom quadrant of the antenna footprint, and the dipoles 153-154 are positioned in a right quadrant of the antenna footprint. Additionally, the dipoles 131-132/dipoles 151-152/dipoles 133-134/dipoles 153-154 have 90 degree radial symmetry relative to a center of the dual polarized dipole antenna structure 180.

Figure 5B:
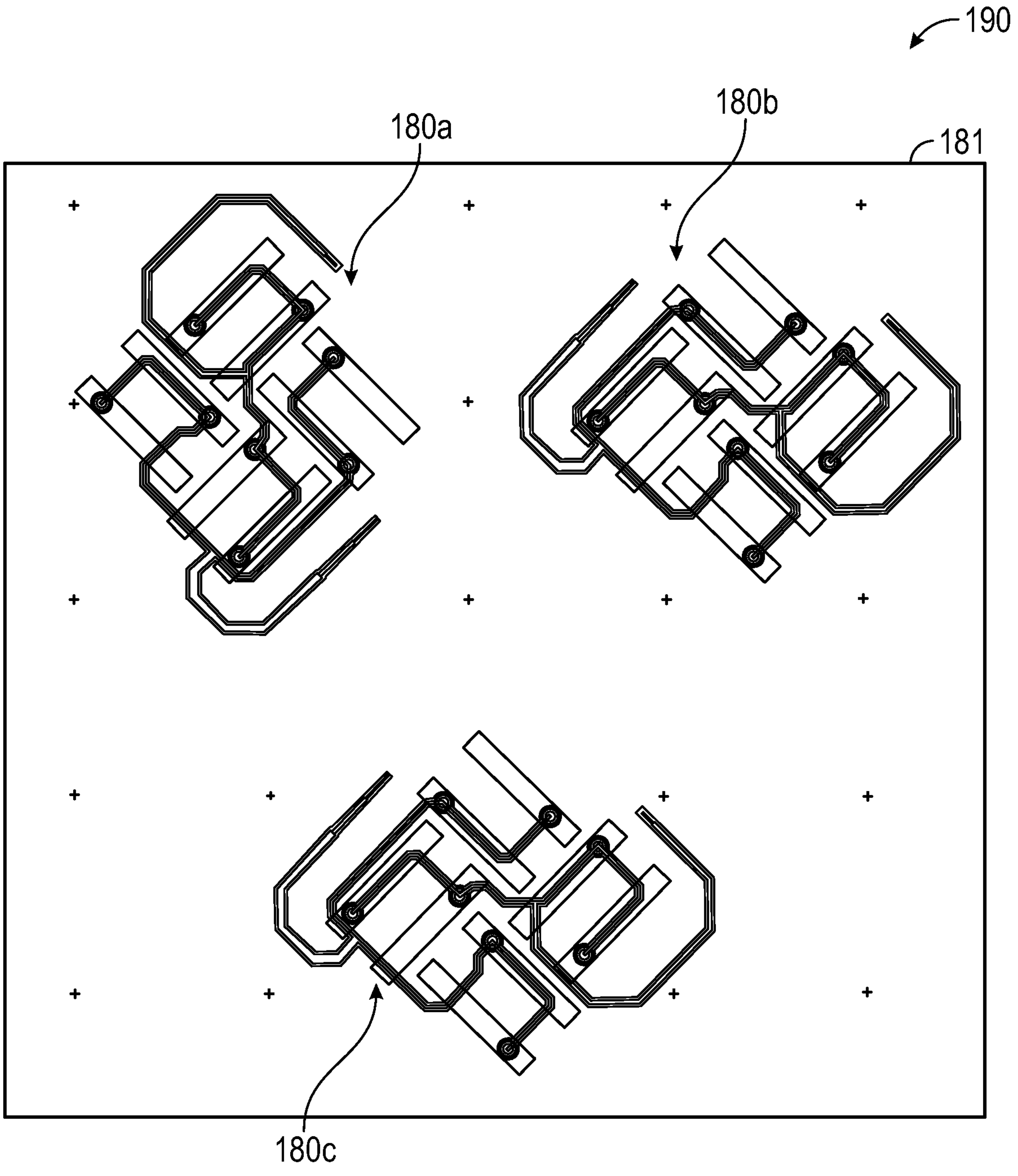
FIG. 5B is a schematic diagram of another embodiment of an antenna array.

FIG. 5B is a schematic diagram of another embodiment of an antenna array 190. The antenna array 190 includes three instantiations of the dual polarized dipole antenna structure 180 of FIG. 5A formed in a non-uniform array on a circuit board 181. For example, the non-uniform array can correspond to a 2×3 array in which the middle element of the top row and the left and right elements of the bottom row are empty. Although one example of an antenna array is shown, the dipole antenna structures disclosed herein can be arranged in a wide variety of ways in an array.

In the illustrated embodiment, the antenna array 190 includes a first dual polarized dipole antenna structure **180*a*, a second dual polarized dipole antenna structure 180*b*, and a third dual polarized dipole antenna structure 180*c*. The first dual polarized dipole antenna structure 180*a* is rotated by 90 degrees relative to the second dual polarized dipole antenna structure 180*b* and the third dual polarized dipole antenna structure 180*c*** for enhanced isolation and reduced coupling.

Figure 6:
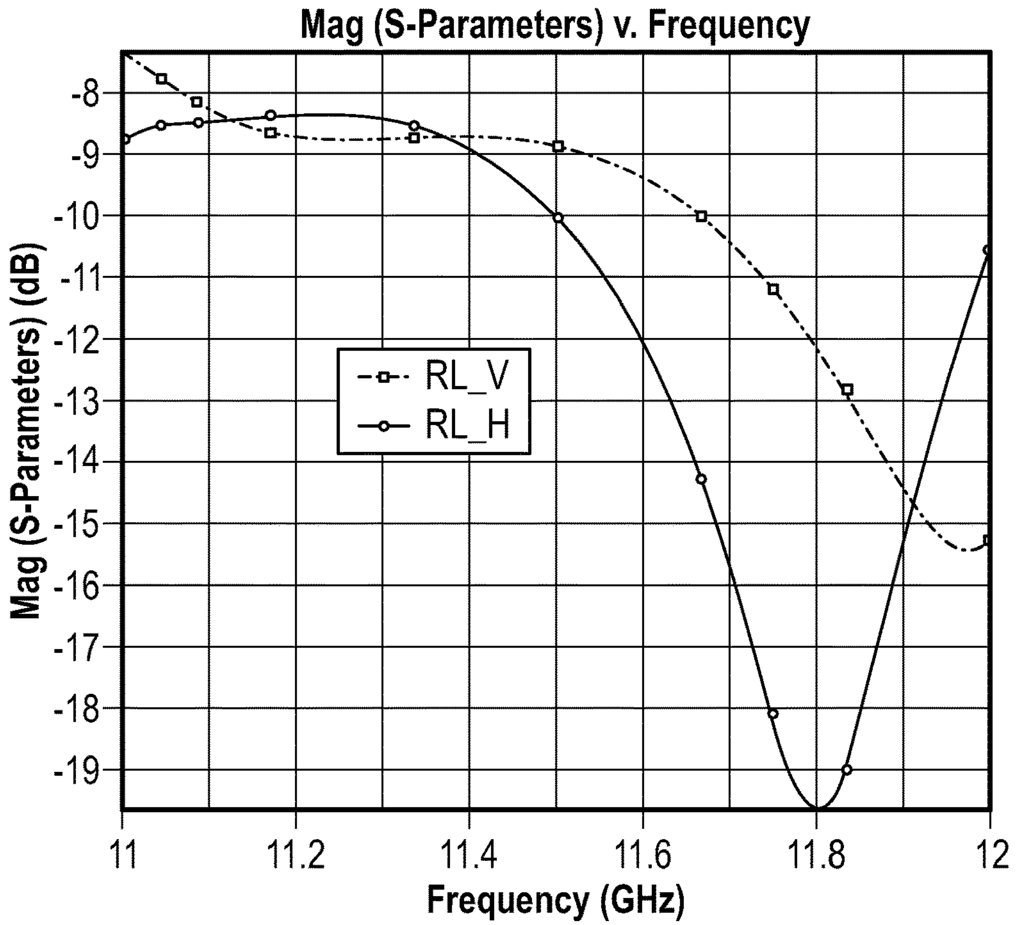
FIG. 6 is a graph of one example of return loss versus frequency for the antenna array of FIG. 5B.

FIG. 6 is a graph of one example of return loss versus frequency for the antenna array 190 of FIG. 5B. Return loss for both horizonal polarization (RL_H) and vertical polarization (RL_V) is shown. As shown in FIG. 6, the antenna array exhibits excellent return loss over a range of frequency spanning from 11 GHz to 12 GHz.

Figure 7:
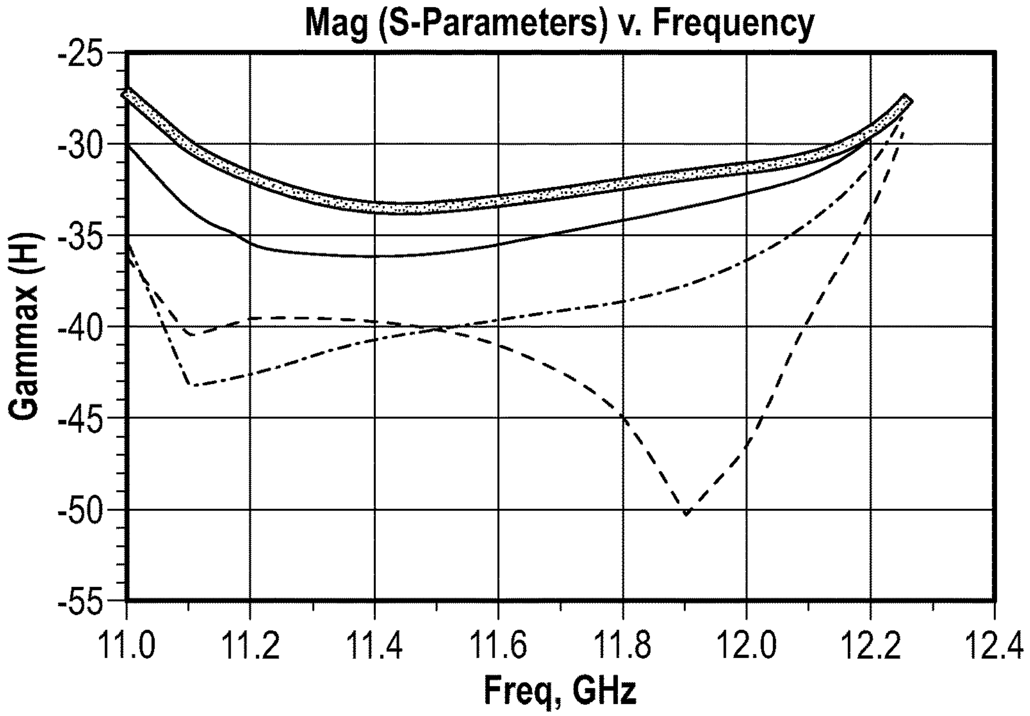
FIG. 7 is a graph of one example of active isolation versus frequency for four different scanning angles for the antenna array of FIG. 5B.

FIG. 7 is a graph of one example of active isolation versus frequency for four different scanning angles for the antenna array 190 of FIG. 5B. As shown in FIG. 7, isolation remains high across scanning angle. Thus, the antenna array 190 does not suffer from an impedance that is very dependent on the phases given to the antenna elements of the array. Thus, array performance is consistent as scanning angle is changed.

Figure 8:
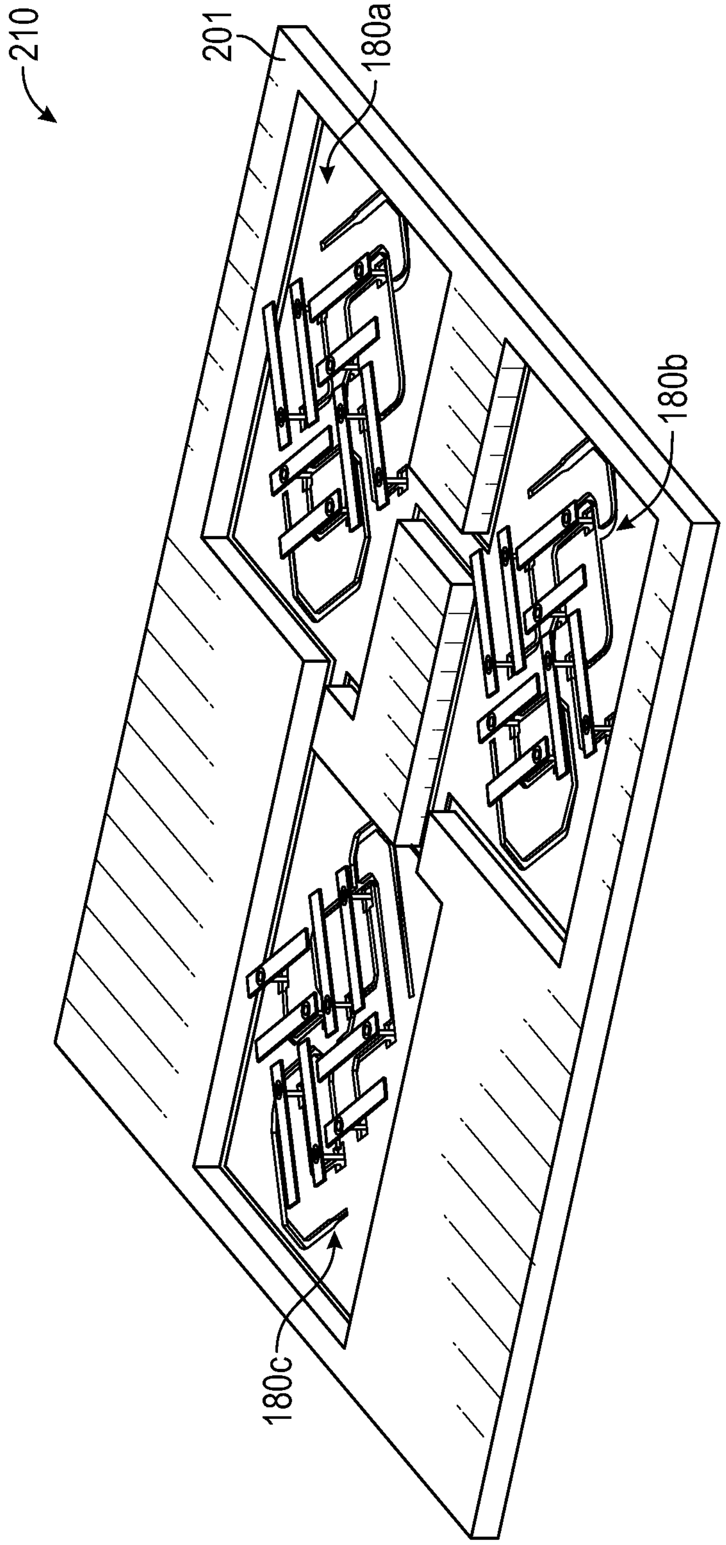
FIG. 8 is a schematic diagram of another embodiment of an antenna array.

FIG. 8 is a schematic diagram of another embodiment of an antenna array 210. The antenna array 210 includes a circuit board 201 on which a first dual polarized dipole antenna structure **180*a*, a second dual polarized dipole antenna structure 180*b*, and a third dual polarized dipole antenna structure 180*c* are formed. The antenna array 210 of FIG. 8 is similar to the antenna array 190 of FIG. 5B, except that the antenna array 210 further includes a metallic shielding structure 201, which can be formed of conductive walls and/or vias. The metallic shielding structure 201 is electrically floating (non-grounded), in this embodiment. The metallic shielding structure 201 laterally surrounds each of the antenna structures 180*a*-180*c***.

By including the metallic shielding structure 201, an enhancement to isolation can be achieved. For example, the antenna array 210 of FIG. 8 can achieve coupling of less than-35 dB.

Applications

Devices employing the above-described schemes can be implemented into various electronic devices. Examples of electronic devices include, but are not limited to, RF communication systems, consumer electronic products, electronic test equipment, communication infrastructure, etc. For instance, one or more antennas can be included in a wide range of RF communication systems, including, but not limited to, radar systems, base stations, mobile devices (for instance, smartphones or handsets), phased array antenna systems, laptop computers, tablets, and/or wearable electronics.

The teachings herein are applicable to RF communication systems operating over a wide range of frequencies, including not only RF signals between 100 MHZ and 7 GHz, but also to higher frequencies, such as those in the X band (about 7 GHz to 12 GHz), the Ku band (about 12 GHz to 18 GHZ), the K band (about 18 GHz to 27 GHZ), the $K_a$ band (about 27 GHz to 40 GHZ), the V band (about 40 GHz to 75 GHZ), and/or the W band (about 75 GHz to 110 GHz). Accordingly, the teachings herein are applicable to a wide variety of RF communication systems, including microwave communication systems.

The RF signals wirelessly communicated by the antennas herein can be associated with a variety of communication standards, including, but not limited to, Global System for Mobile Communications (GSM), Enhanced Data Rates for GSM Evolution (EDGE), Code Division Multiple Access (CDMA), wideband CDMA (W-CDMA), 3G, Long Term Evolution (LTE), 4G, 5G and/or 6G, as well as other proprietary and non-proprietary communications standards.

CONCLUSION

The foregoing description may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual embodiment (assuming that the functionality of the depicted circuits is not adversely affected).

While certain embodiments have been described, these embodiments have been presented by way of example only, and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. For example, while the disclosed embodiments are presented in a given arrangement, alternative embodiments may perform similar functionalities with different components and/or circuit topologies, and some elements may be deleted, moved, added, subdivided, combined, and/or modified. Each of these elements may be implemented in a variety of different ways. Any suitable combination of the elements and acts of the various embodiments described above can be combined to provide further embodiments.

What is claimed is:

1. A circuit board comprising:

a first conductive layer including a first plurality of dipoles of a first antenna structure, the first plurality of dipoles including a first dipole, a second dipole, a third dipole, and a fourth dipole arranged in parallel and each extending straightly in a first direction, the first dipole and the second dipole spaced apart from one another in a second direction substantially perpendicular to the first direction, wherein a first end of the first dipole and a first end of the second dipole are aligned with one another in the second direction;

a second conductive layer separated from the first conductive layer in a third direction that is substantially perpendicular to the first direction and the second direction, the second conductive layer including a first signal delay line structure of the first antenna structure, wherein the first signal delay line structure is electrically connected to a first common signal feed; and a plurality of vias including a first via coupling the first dipole to the first signal delay line structure, a second via coupling the second dipole to the first signal delay line structure, a third via coupling the third dipole to the first signal delay line structure, and a fourth via coupling the fourth dipole to the first signal delay line structure.

2. The circuit board of claim 1, wherein the first dipole, the second dipole, the third dipole, and the fourth dipole are of about equal length and of about equal width.

3. The circuit board of claim 1, wherein all ends of the first dipole, the second dipole, the third dipole, and the fourth dipole are aligned with one another in the second direction.

4. The circuit board of claim 1, further comprising a second plurality of dipoles of the first antenna structure formed in the first conductive layer, wherein the second plurality of dipoles extend straightly in the second direction.

5. The circuit board of claim 4, wherein the first dipole and the second dipole form a first pair of dipoles and the third dipole and the fourth dipole form a second pair of dipoles, wherein the second plurality of dipoles comprise a third pair of dipoles and a fourth pair of dipoles, wherein the first pair of dipoles, the second pair of dipoles, the third pair of dipoles, and the fourth pair of dipoles have 90° rotational symmetry.

6. The circuit board of claim 4, further comprising a second signal delay line structure electrically connected between a second common signal feed and the second plurality of dipoles, wherein the first common signal feed handles a radio frequency (RF) signal of a first polarization, and the second common signal feed handles an RF signal of a second polarization.

7. The circuit board of claim 1, wherein the first delay line structure comprises a first delay line electrically connecting the first via to the first common signal feed, a second delay line electrically connecting the first via to the second via, a third delay line electrically connecting the third via to the first common signal feed, and a fourth delay line electrically connecting the third via to the fourth via.

8. The circuit board of claim 7, wherein the first dipole and the third dipole are positioned between the second dipole and the fourth dipole.

9. The circuit board of claim 1, further comprising a metallic shielding structure laterally surrounding first plurality of dipoles and the first signal delay line structure, wherein the metallic shielding structure is electrically floating.

10. The circuit board of claim 1, wherein the first conductive layer further comprises a second plurality of dipoles of a second antenna structure, wherein the the second plurality of dipoles extend straightly in the second direction.

11. A method of antenna formation, the method comprising:

patterning a first conductive layer of a circuit board to include a first plurality of dipoles of a first antenna structure, the first plurality of dipoles including a first dipole, a second dipole, a third dipole, and a fourth dipole arranged in parallel and each extending straightly in a first direction, the first dipole and the second dipole spaced apart from one another in a second direction substantially perpendicular to the first direction, wherein a first end of the first dipole and a first end of the second dipole are aligned with one another in the second direction;

patterning a second conductive layer of the circuit board to include a first signal delay line structure of the first antenna structure, wherein the first signal delay line structure is electrically connected to a first common signal feed; and forming a plurality of vias including a first via coupling the first dipole to the first signal delay line structure, a second via coupling the second dipole to the first signal delay line structure, a third via coupling the third dipole to the first signal delay line structure, and a fourth via coupling the fourth dipole to the first signal delay line structure.

12. A radio frequency communication system comprising:

a front end system; and an antenna array electrically connected to the front end system and formed on a circuit board, wherein a first antenna structure of the antenna array comprises:

a first plurality of dipoles formed in a first conductive layer of the circuit board, the first plurality of dipoles including a first dipole, a second dipole, a third dipole, and a fourth dipole arranged in parallel and each extending straightly in a first direction, the first dipole and the second dipole spaced apart from one another in a second direction substantially perpendicular to the first direction, wherein a first end of the first dipole and a first end of the second dipole are aligned with one another in the second direction;

a first signal delay line structure formed in a second conductive layer of the circuit board, wherein the first signal delay line structure is connected to a first common signal feed; and a plurality of vias including a first via coupling the first dipole to the first signal delay line structure, a second via coupling the second dipole to the first signal delay line structure, a third via coupling the third dipole to the first signal delay line structure, and a fourth via coupling the fourth dipole to the first signal delay line structure.

13. The radio frequency communication system of claim 12, wherein the first dipole, the second dipole, the third dipole, and the fourth dipole are of about equal length and of about equal width.

14. The radio frequency communication system of claim 12, wherein all ends of the first dipole, the second dipole, the third dipole, and the fourth dipole are aligned with one another.

15. The radio frequency communication system of claim 12, further comprising a second plurality of dipoles formed in the first conductive layer, wherein the second plurality of dipoles extend straightly in the second direction.

16. The radio frequency communication system of claim 15, wherein the first dipole and the second dipole form a first pair of dipoles and the third dipole and the fourth dipole form a second pair of dipoles, wherein the second plurality of dipoles comprise a third pair of dipoles and a fourth pair of dipoles, wherein the first pair of dipoles, the second pair of dipoles, the third pair of dipoles, and the fourth pair of dipoles have 90° rotational symmetry.

17. The radio frequency communication system of claim 12, wherein the first delay line structure comprises a first delay line electrically connecting the first via to the first common signal feed, a second delay line electrically connecting the first via to the second via, a third delay line electrically connecting the third via to the first common signal feed, and a fourth delay line electrically connecting the third via to the fourth via.

18. The radio frequency communication system of claim 17, wherein the first dipole and the third dipole are positioned between the second dipole and the fourth dipole.

19. The radio frequency communication system of claim 12, further comprising a metallic shielding structure laterally surrounding first plurality of dipoles and the first signal delay line structure, wherein the metallic shielding structure is electrically floating.

20. The method of claim 11, further comprising providing shielding using a metallic shielding structure laterally surrounding first plurality of dipoles and the first signal delay line structure, wherein the metallic shielding structure is electrically floating.

* * * * *